(12) United States Patent
Bychkov et al.

(10) Patent No.: US 8,509,743 B2
(45) Date of Patent: *Aug. 13, 2013

(54) MOOD-BASED MESSAGING

(75) Inventors: Eyal Bychkov, Hod Hasharon (IL); Uri Ron, Tel Aviv (IL); Dov Moran, Kfar Saba (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,410

(22) Filed: Apr. 17, 2012

(65) Prior Publication Data

US 2012/0280951 A1    Nov. 8, 2012

Related U.S. Application Data

(63) Continuation of application No. 12/611,950, filed on Nov. 4, 2009, now Pat. No. 8,160,549, which is a continuation-in-part of application No. 12/146,710, filed on Jun. 26, 2008, now Pat. No. 7,616,948, which is a continuation-in-part of application No. 10/770,505, filed on Feb. 4, 2004, now Pat. No. 7,398,081.

(60) Provisional application No. 61/237,458, filed on Aug. 27, 2009.

(51) Int. Cl.
   *H04L 12/58*   (2006.01)
   *H04M 1/725*   (2006.01)
   *H04W 4/12*    (2009.01)
   *H04L 29/08*   (2006.01)

(52) U.S. Cl.
   CPC .............. *H04W 4/12* (2013.01); *H04L 12/5895* (2013.01); *H04L 29/08108* (2013.01)

USPC ...................................... 455/412.1; 455/414.1

(58) Field of Classification Search
   USPC ............................ 345/184; 455/412.1, 414.1
   See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,477,357 B1 | 11/2002 | Cook |
| 6,516,202 B1 | 2/2003 | Hawkins et al. |

(Continued)

FOREIGN PATENT DOCUMENTS

| | | |
|---|---|---|
| EP | 1871075 A1 | 12/2007 |
| WO | 9421058 A1 | 9/1994 |

(Continued)

*Primary Examiner* — William D Cumming
(74) *Attorney, Agent, or Firm* — Soquel Group LLC

(57) ABSTRACT

A method for social interacting, including using a portable messaging device for designating, from time to time, a plurality of friends, selecting a mood, sending one or more representations of the selected mood to each of the plurality of designated friends, further selecting an updated mood, and further sending one or more representations of the updated mood to each of the plurality of designated friends, to supersede the previously sent one or more representations of the mood. A user interface is also described and claimed.

21 Claims, 8 Drawing Sheets

(56) References Cited

U.S. PATENT DOCUMENTS

| | | |
|---|---|---|
| 6,640,113 B1 | 10/2003 | Shim et al. |
| 6,690,947 B1 | 2/2004 | Tom |
| 6,898,283 B2 | 5/2005 | Wycherley et al. |
| 6,907,264 B1 | 6/2005 | Sterkel |
| 6,980,149 B1 | 12/2005 | Meyer |
| 6,999,792 B2 | 2/2006 | Warren |
| 7,085,542 B2 | 8/2006 | Dietrich et al. |
| 7,194,285 B2 | 3/2007 | Tom |
| 7,266,391 B2 | 9/2007 | Warren |
| 7,284,033 B2 | 10/2007 | Jhanji |
| 7,398,081 B2 * | 7/2008 | Moran .................. 455/414.1 |
| 7,477,919 B2 | 1/2009 | Warren |
| 7,515,937 B2 | 4/2009 | Lee |
| 7,616,948 B2 * | 11/2009 | Moran .................. 455/414.1 |
| 8,160,549 B2 * | 4/2012 | Bychkov et al. ........... 455/412.1 |
| 2002/0090980 A1 | 7/2002 | Wilcox et al. |
| 2002/0151327 A1 | 10/2002 | Levitt |
| 2004/0030741 A1 | 2/2004 | Wolton et al. |
| 2004/0233930 A1 | 11/2004 | Colby, Jr. |
| 2004/0268005 A1 | 12/2004 | Dickie |
| 2005/0159184 A1 | 7/2005 | Kerner et al. |
| 2006/0003804 A1 | 1/2006 | Liu |
| 2006/0031101 A1 | 2/2006 | Ross |
| 2006/0094404 A1 | 5/2006 | Burgess |
| 2006/0105722 A1 | 5/2006 | Kumar |
| 2006/0170945 A1 | 8/2006 | Bill |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |
| 2008/0155080 A1 | 6/2008 | Marlow et al. |
| 2008/0228587 A1 | 9/2008 | Slaney et al. |
| 2009/0047972 A1 | 2/2009 | Neeraj |
| 2009/0117850 A1 | 5/2009 | Jokinen |
| 2010/0011388 A1 | 1/2010 | Bull et al. |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

* cited by examiner

MOOD-BASED MESSAGING

CROSS REFERENCES TO RELATED APPLICATIONS

This application is a continuation of assignee's pending application U.S. Ser. No. 12/611,950, filed on Nov. 4, 2009 now U.S. Pat. No. 8,160,549 by inventors Eyal Bychkov, Uri Ron and Dov Moran, which is a continuation-in-part of assignee's pending application U.S. Ser. No. 12/146,710, now U.S. Pat. No. 7,616,948, filed on Jun. 26, 2008 by inventor Dov Moran, entitled DEVICE AND SYSTEM FOR SELECTIVE WIRELESS COMMUNICATION WITH CONTACT LIST MEMORY, which is a continuation of U.S. Ser. No. 10/770,505, now U.S. Pat. No. 7,398,081, filed on Feb. 4, 2004 by inventor Dov Moran, entitled DEVICE AND SYSTEM FOR SELECTIVE WIRELESS COMMUNICATION WITH CONTACT LIST MEMORY.

This application claims benefit of U.S. Provisional Application No. 61/237,458, entitled MOOD-BASED MESSAGING, filed on Aug. 27, 2009 by inventors Eyal Bychkov, Uri Ron and Dov Moran.

FIELD OF THE INVENTION

The field of the present invention is portable messaging devices.

BACKGROUND OF THE INVENTION

Social network services are used to build online communities of people who share common interests. Most social network services are Internet-based, and enable users to communicate using instant messaging, e-mail messages, web pages, web blogs, and other forms of communication. Examples of popular social network services today include FACEBOOK®, developed by Facebook, Inc. of Palo Alto, Calif., MYSPACE®, developed by MySpace, Inc. of Los Angeles, Calif., TWITTER®, developed by Twitter, Inc. of San Francisco, Calif., LINKEDIN®, developed by LinkedIn Corp. of Mountain View, Calif., NEXOPIA®, developed by Nexopia.com, Inc. of Edmonton, Alberta, and XING®, developed by Xing, AG of Hamburg, Germany.

Many social network services enable a user to publish his status, such as "available", "off-line", "busy" or "away". However, only users who actively opt-in to be updated of a specific user's status are notified of the specific user's status updates.

It would thus be of advantage to enable users to send updates of their statuses to designated sets of friends, without requiring the friends to opt-in.

SUMMARY OF THE DESCRIPTION

Aspects of the present invention relate to a "portable messaging device" that sends and receives information about "moods" of friends. The term portable messaging device refers to an electronic communication device that enables sending and receiving notifications from other such devices. Portable messaging devices include inter alia cell phones, and laptop computers such as ultra-mobile PCs, mobile Internet devices and tablet laptops. A mood is a selectable descriptor such as "happy", "sad", "tired" and "surprised", for indicating the status of a user. A mood may also have a selectable strength associated therewith, indicating how happy, how sad, how tired, or how surprised the user is.

The portable messaging device of the present invention includes a user interface that facilitates specifying and publishing a user's mood and other status information, such as a user's whereabouts, and that displays friends' current moods.

The portable messaging device enables a user to designate a set of one or more friends, referred to as "friends-to-notify", who receive notifications of the user's mood updates. Mood information is transmitted to the friends-to-notify in the form of a message, including an image representing the user's current mood, and an optional color-code or text descriptor representing the user's current whereabouts.

The present invention is useful in stimulating communication among friends.

The present invention may be integrated with existing social network services, such that a user's mood setting on the portable messaging device is automatically propagated to his social networks.

There is thus provided in accordance with an embodiment of the present invention a method for social interacting, including using a portable messaging device for designating, from time to time, a plurality of friends, selecting a mood, sending one or more representations of the selected mood to each of the plurality of designated friends, further selecting an updated mood, and further sending one or more representations of the updated mood to each of the plurality of designated friends, to supersede the previously sent one or more representations of the mood.

There is additionally provided in accordance with an embodiment of the present invention a method for social interacting, including using a portable messaging device for designating by a user, from time to time, a plurality of friends, including receiving by the user, from each of the plurality of friends, an invitation of friendship, and accepting by the user, the received invitations, displaying one or more representations of a friend's mood for at least one of the plurality of designated friends, receiving one or more updated representations of a friend's mood from at least one of the plurality of designated friends, and updating the displaying according to the received one or more updated representations.

There is further provided in accordance with an embodiment of the present invention a user interface for social interacting using a portable messaging device, including a display for displaying representations of moods of a first plurality of friends, an activatable mood selector for selecting one of several moods, and an activatable update button for sending one or more representations of the selected mood to a second plurality of friends.

There is yet further provided in accordance with an embodiment of the present invention a means for wirelessly communicating with a plurality of friends that have portable messaging devices, via phone, SMS, MMS or such other medium of wireless communication.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a portable messaging device, for sending and receiving information about a user's moods and moods of his friends.

Figure 1:
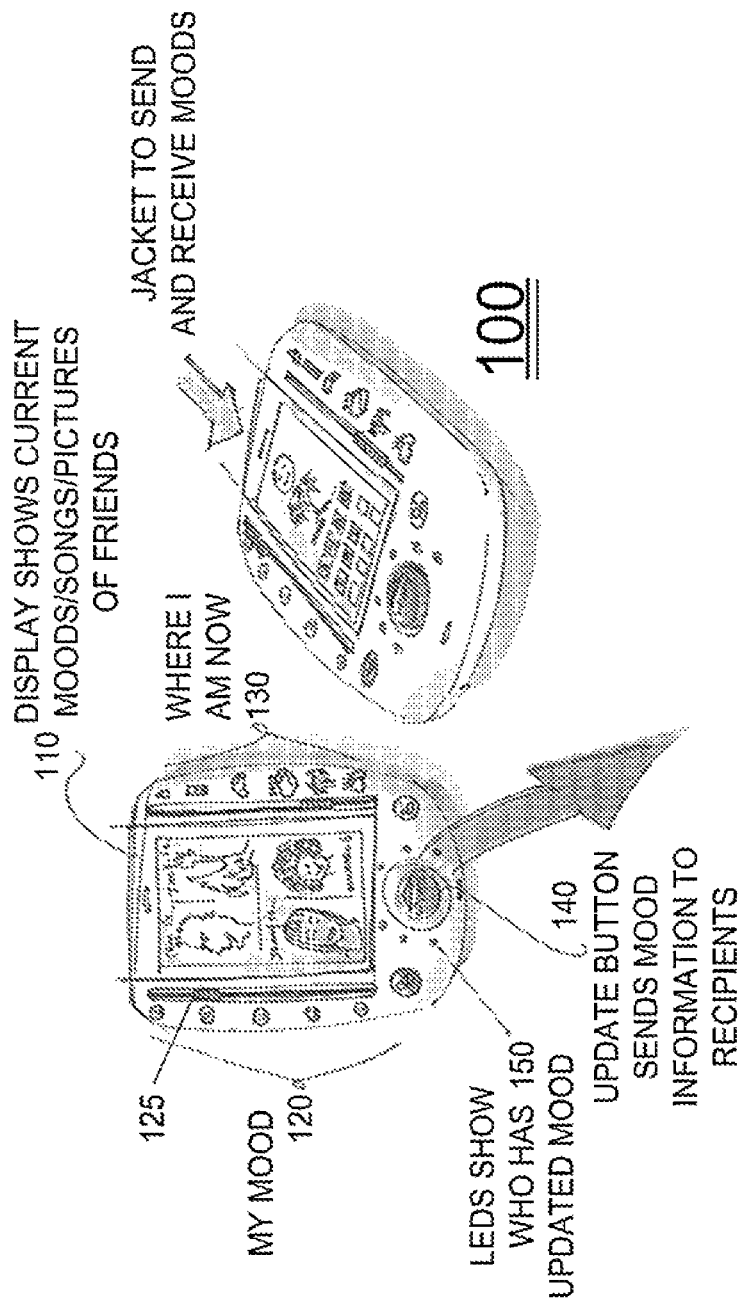
FIG. 1 is a simplified diagram of a mood-based messaging device, in accordance with an embodiment of the present invention.

Reference is made to FIG. 1, which is a simplified diagram of a mood-based messaging device 100, in accordance with an embodiment of the present invention. Mood-based messaging device 100 is operative to set a user's current mood, to notify designated friends of the user's mood, and vice versa to notify the user of others' moods.

In accordance with an embodiment of the present invention, a mood is a descriptor for a user. Examples of moods may include inter alia "happy", "sad", "tired", "open for suggestions" and "surprised". A mood may have a strength/intensity associated therewith, reflecting how happy, how sad, how tired or how surprised the user is. Examples of strengths/intensities may include inter alia "very" surprised, "quite" surprised, "moderately" surprised, "mildly" surprised, "somewhat" surprised, "a bit" surprised" and "hardly" surprised.

Optionally, with a mood may be associated one or more representations of the mood. A representation of a mood may be, inter alia, (i) a descriptive word or phrase, (ii) an image showing a picture or caricature of the user, or of someone or something else, in accordance with the mood, (iii) an audio clip, in accordance with the mood, or (iv) a video clip, in accordance with the mood. The user may change the one or more representations of his mood from time to time. In addition, the strength/intensity of a mood may be represented inter alia by color coding the representation of the mood, by adding an adjective to the representation of the mood, and/or by size of the representation of the mood.

Further in accordance with an embodiment of the present invention, a user designates one or more friends, referred to herein as "friends-to-notify", to whom he would like to send his mood information. In addition, the user may also designate one or more friends, referred to herein as "friends-to-monitor", from whom he would like to receive their mood information. It is understood that the friends-to-notify and the friends-to-monitor may be the same set of friends, or different sets of friends.

Generally, mood-based messaging device 100 stores a list of the user's contacts. In accordance with an embodiment of the present invention, contacts listed in the user's contact list in mood-based messaging device 100 may be automatically designated as the user's friends-to-notify. Alternatively, the user may manually select his friends-to-notify from the entries in his contact list. Further in accordance with an embodiment of the present invention, the image displayed by default for a member of the friends-to-monitor is an image that is stored for the member in the user's contact list.

Generally, there are several people whom a user would like to notify of his moods, such as his family and best friends. The user does not need to designate the members of his friends-to-notify every time he wishes to notify them of his mood. Instead, the user can designate the members of his friends-to-notify once, and update his friends-to-notify every so often, or whenever the need arises based on a change in relationship between the user and a specific person.

In some embodiments of the present invention, when User A designates User B as an entry to his friends-to-notify list, User B is asked to approve the entry. Upon approval, User A is automatically designated as one of User B's friends-to-monitor. User A then receives a confirmation that User B has agreed to be a member of User A's friends-to-notify, and that User A has been designated as a member of User B's friends-to-monitor. In accordance with an embodiment of the present invention, in reciprocity User B automatically offers User A to be designated as a member of User B's friends-to-notify list.

Mood-based messaging device 100 includes a display 110, shown at the left of FIG. 1 displaying four mood images, for four friends, Tom, Jack, Jenny and Michael, from among the user's friends-to-monitor. Each image shows one of the friends according to the friend's mood.

When there are too many friends to display all of their mood images at once, the user may specify that the images be displayed according to most recent mood updates. Alternatively or additionally, the user may specify some friends whose mood images are always to be displayed. Alternatively or additionally, the user may specify some friends whose mood images are not to be displayed. For example, the user may specify that the mood images of his best two friends are always to be displayed, and two additional mood images most recently updated are also to be displayed.

Display 110 is shown at the right of FIG. 1 displaying the user's mood and whereabouts; namely, a happy face and an outdoor picture. Mood-based messaging device 100 includes a panel of buttons 120, for a user to select his mood from among a plurality of moods. Alongside buttons 120 is a slider bar 125 for selecting a strength/intensity of a mood. In another embodiment of the present invention, the strength/intensity of a mood is selected using a force sensor, such as the pressure touch sensor developed and manufactured by Peratech Limited of North Yorkshire, United Kingdom.

In an embodiment of the present invention, a dedicated button is used to switch display 110 from displaying the user's mood to displaying the friends-to-monitor's moods.

Mood-based messaging device 100 includes another slider bar 130, for indicating the user's whereabouts, such as at home, at work, in a car, in bed sleeping, outdoors and in the rain. In accordance with an embodiment of the present invention, the user's whereabouts may be specified in terms of real coordinates, in terms of relative coordinates, or in terms of location relative to a friend's location, as described in provisional patent application U.S. Ser. No. 61/163,479, filed on Mar. 26, 2009, entitled LOCATING MOBILE CONTACTS USING A GEO-CONTACT LIST, the contents of which are hereby incorporated by reference.

In an embodiment of the present invention, mood-based messaging device 100 calculates the distances from the user's location to the friends-to-monitor's locations, and provides the whereabouts of the friends-to-monitor as distances from the user's whereabouts.

Mood-messaging device 100 includes an update button 140, for sending the user's updated mood information to his friends-to-notify. The user's updated mood information includes inter alia one or more of (i) a representation of the user's updated mood, (ii) a representation of the user's updated whereabouts, (iii) a text message, (iv) an audio notification in the form of an audio clip, and (v) a time stamp, indicating the time & date of the current mood update.

The user's updated whereabouts may be represented by GPS coordinates, by cell data, and/or include friendly name descriptors such as "at home" or "in school". Alternatively or additionally, the user's updated whereabouts may include a text description such as "100 meters from you." The user's updated whereabouts may be displayed by color coding or such other emphasis based on the user's proximity to the friend.

Similarly, whereabouts of friends-to-monitor, which are received by mood-based messaging device 100 in GPS coordinate representation, may be translated to a friendly name descriptor or a text description for display.

The user's updated mood may be represented inter alia by an image of the user in accordance with the mood, such as an image of the user being happy, or an image of the user being tired. The image is stored in mood-based messaging device 100, and selected by associating the user's mood therewith. Alternatively, the user captures an updated picture of himself representing his current mood. The updated picture is stored as the new picture associated with the mood. Yet alternatively, the old picture remains associated with the user's mood and the new picture is sent during an update.

The strength/intensity of the user's updated mood may be represented inter alia by color coding the representation of the user's mood or by color coding the text message, by adding an adjective to the representation of the user's mood or by adding an adjective to the text message, and/or by display size of the representation of the user's mood or display size of the text message, and/or by use of a color bar.

Mood-based messaging device 100 includes a plurality of LEDs 150, for indicating that one or more of the user's friends-to-monitor, has updated his mood.

When display 110 is a touch-sensitive display, the images of the moods of the friends-to-monitor that are displayed, as shown in the left side of FIG. 1, are functional, upon touch selection, to easily activate individual or group communication with one or more of the friends. Thus the user, in response to a change of mood status in a friend-to-monitor, may communicate with the friend by voice call, text message, MMS or such other medium of communication.

Figure 2:
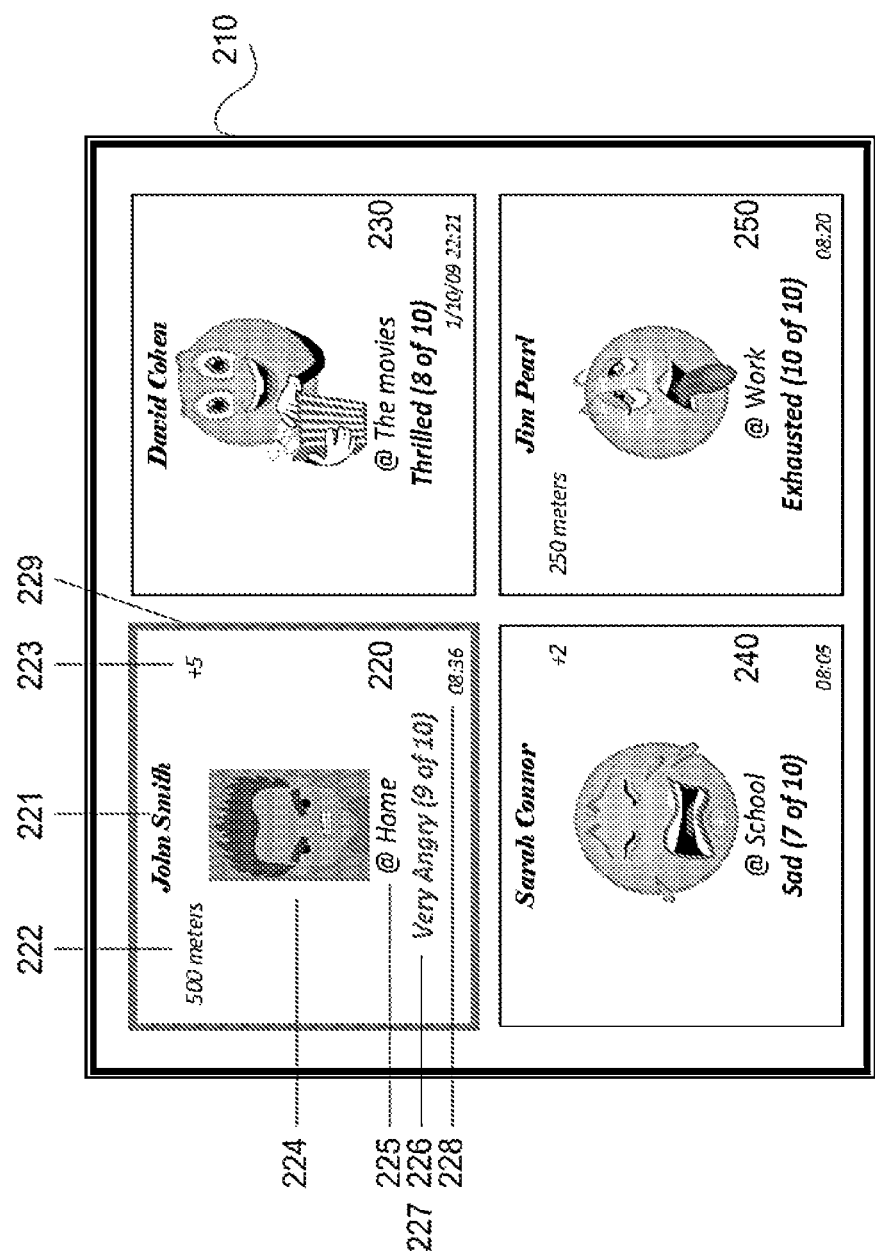
FIG. 2 is an illustration of a screen displaying moods of a user's friends-to-monitor, in accordance with an embodiment of the present invention.

Reference is made to FIG. 2, which is an illustration of a screen 210 displaying moods of a user's friends-to-monitor, in accordance with an embodiment of the present invention. Screen 210 may be a touch sensitive screen, or a non-touch sensitive screen. Screen 210 displays four frames, displaying four out of ten friends-to-monitor moods. Frame 220 shows friend-to-monitor John Smith in a "Very Angry" mood. Frame 230 shows friend-to-monitor David Cohen in a "Thrilled" mood. Frame 240 shows friend-to-monitor Sarah Connor in a "Sad" mood. Frame 250 shows friend-to-monitor Jim Pearl in an "Exhausted" mood.

Each frame includes data for various fields. In particular, frame 220 includes data for fields 221-228 listed in TABLE I.

TABLE I

Data fields displayed for the mood of a friend-to-monitor

| Field | Description |
|---|---|
| Name 221 | The friend's name, generally taken from a local contact list. |
| Distance 222 | Distance away from user. Generally the distance is displayed only if it is less than a pre-specified threshold, such as 1 km. Larger distances are not displayed. |
| Missed moods 223 | The number of the friend's mood notifications that the user has not reviewed. |
| Image 224 | A representation of the mood, selected by the friend. If the friend does not attach an image, the image may be a default image associated with the mood, or an image associated with the friend in the user's contact list. |
| Location 225 | Location chosen by the friend, either a default location, a location from a pre-defined list, or a location entered manually by the friend. |
| Mood 226 | A mood selected from a pre-defined list, or a custom mood entered manually by the friend. |
| Strength 227 | A magnitude for the mood, either color-coded or an adjective preceding the mood, or a number following the mood. |
| Time 228 | The time the mood was sent. |

In accordance with an embodiment of the present invention, when the user receives a new mood notification from John Smith, frame 220 is indicated as being "unread". Such indication may be in the form of a blinking graphic, a special border 229 of frame 220, a special color, and other such displays. A new mood notification may also or alternatively be indicated by a sound, or a vibration, or a light.

To "read" a new mood notification from a friend-to-monitor, the user selects the new mood, by pressing on screen 210 at the location of the new mood notification, if screen 210 is a touch-sensitive screen, or by navigating to the new mood and selecting it, or by such other selection command from a user interface.

Figure 3:
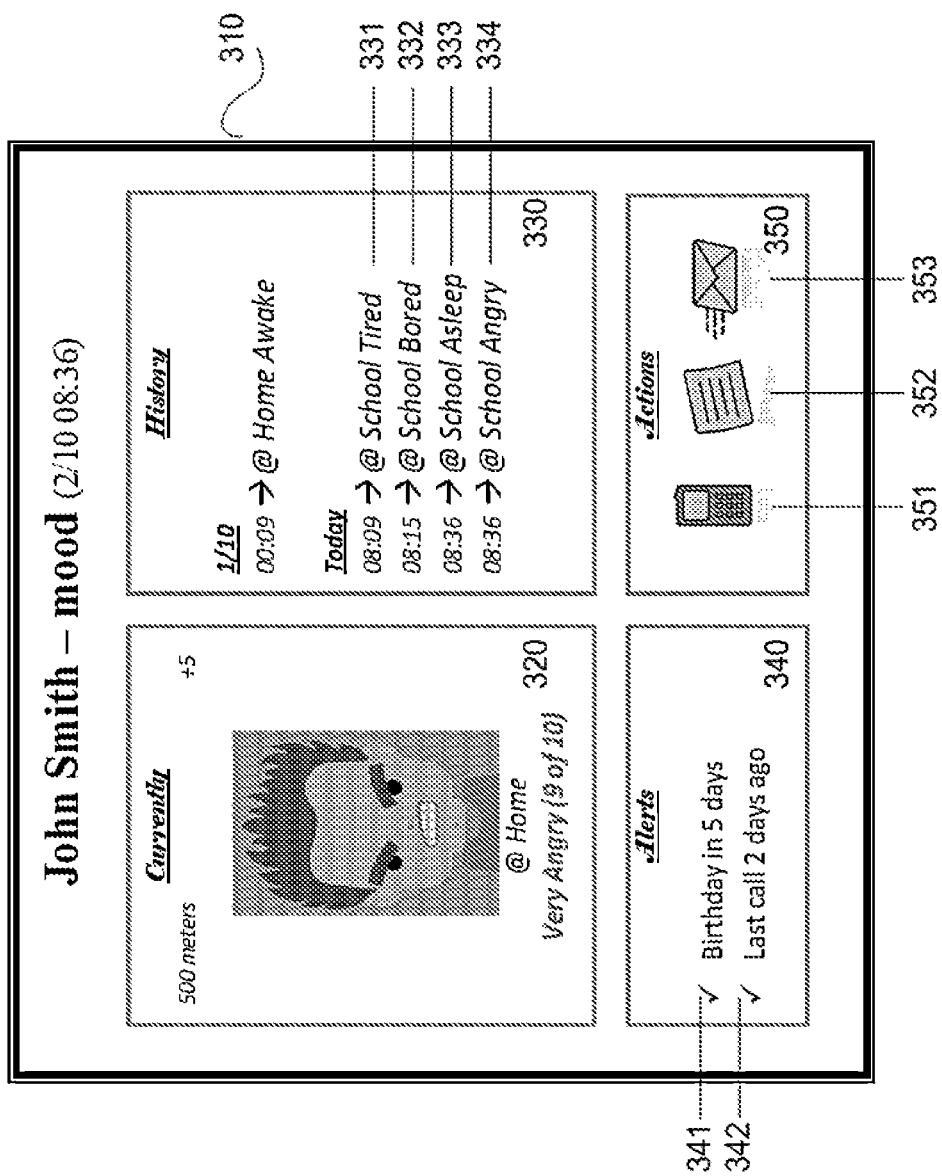
FIG. 3 is an illustration of a screen displaying mood information for a friend-to-monitor, in accordance with an embodiment of the present invention.

Reference is made to FIG. 3, which is an illustration of a screen 310 displaying mood information for a friend-to-monitor, in accordance with an embodiment of the present invention. Shown in FIG. 3 is a mood of friend-to-monitor John Smith, corresponding to the new mood notification in frame 220 of FIG. 2. Screen 310 is activated by selecting frame 220 of FIG. 2. Screen 310 includes four frames; namely, frame 320 with John Smith's current mood information;
frame 330 with a history of John Smith's most recent moods 331-334;
frame 340 with alerts 341 and 342 related to John Smith; and
frame 350 with actions that can be performed for John Smith, such as an action 351 for calling him, or an action 352 for sending him an SMS message, or an action 353 for sending him an e-mail.

The number of recent moods displayed in history frame 330 is user-configurable.

Figure 4:
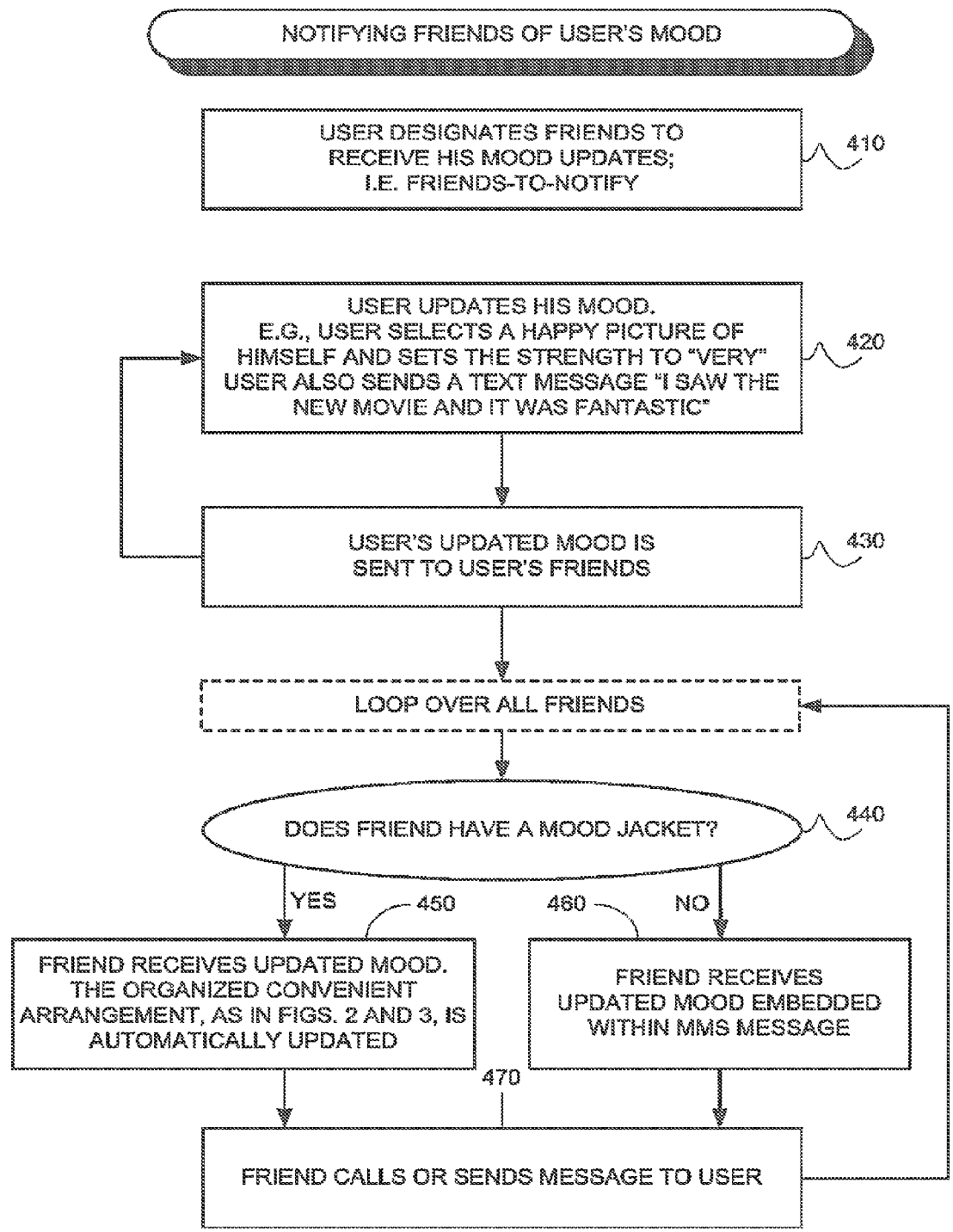
FIG. 4 is a simplified flowchart of operation of the mood-based messaging device of FIG. 1 for notifying friends of a user's mood, in accordance with an embodiment of the present invention.

Reference is made to FIG. 4, which is a simplified flowchart of operation of mood-based messaging device 100 for notifying friends of a user's mood, in accordance with an embodiment of the present invention. At step 410, the user designates one or more friends to receive his mood updates; i.e., the user designates his friends-to-notify. Step 410 is performed periodically, and not necessarily at the times when the user notifies friends of his mood. As such, there is no flow arrow in FIG. 4 between step 410 and step 420.

At step 420, the user updates his mood. For example, the user may select a "happy" mood and select a strength/intensity of "very". The user may also include a text message, such as "I saw the new movie and it is fantastic." The user may also capture a picture of himself and associate it with his "happy" mood.

At step 430, the user sends information about his updated mood to his friends-to-notify. In accordance with an embodiment of the present invention, step 430 may alternatively be implemented by using message circulation, according to copending patent application U.S. Ser. No. 12/325,210, filed on Nov. 30, 2008, entitled METHOD AND SYSTEM FOR CIRCULATING MESSAGES, the contents of which are hereby incorporated by reference. According to such embodiment, the user sends his updated mood to a first friend-to-notify, and the update is circulated in sequence through all of the friends-to-notify. As such, the loop over all friends in FIG. 4 is shown in dashed lines, indicating that it is not necessarily required.

Thereafter, each friend who has a mood-based messaging device 100, as determined at step 440, receives the user's text message and a representation of the user's updated mood displayed in a form similar to that shown in FIGS. 2 and 3, including inter alia an image with a picture or caricature of the user, or someone else, in accordance with his updated mood, at step 450. The friend's display 110 is automatically updated, and the user's updated mood supersedes the user's previous mood.

In one embodiment of the present invention, friends who do not have a mood-based messaging device 100 receive only the user's text message without the richer media, at step 460. In another embodiment of the present invention, friends who do not have a mood-based messaging device 100 receive an MMS message, but the message is not processed for automatic display of the user's updated mood, nor for arrangement of the user's updated mood as in FIGS. 2 and 3. Instead, the friend views the updated mood by conventional incoming MMS message processing. In distinction, friends who do have a mood-based messaging device 100, see the user's mood automatically updated on their display 110 in an organized convenient fashion, such as the displays shown in FIGS. 2 and 3.

It will be appreciated by those skilled in the art that notification of a user's updated mood to his friends at step 450 and/or step 460 may be performed inter alia via the medium of an SMS message, via an MMS message, via an e-mail message, via a web-browser, or via a central server. In the central server embodiment, users send their updated moods to a mailbox on the server, and the server sends representations of the updated moods to the users' friends-to-notify.

In response to being notified about the user's updated mood, friends may call or send a message to the user at step 470. The user continues to update his mood at step 420, as appropriate.

It will be appreciated by those skilled in the art that the present invention may be integrated with conventional social networking services, to propagate the user's mood updates to his social networks.

In an embodiment of the present invention, the user may optionally limit the number of mood updates that he sends; e.g., no more than 50 messages per day. Similarly, the friends may also optionally limit the numbers of messages they receive.

Figure 5:
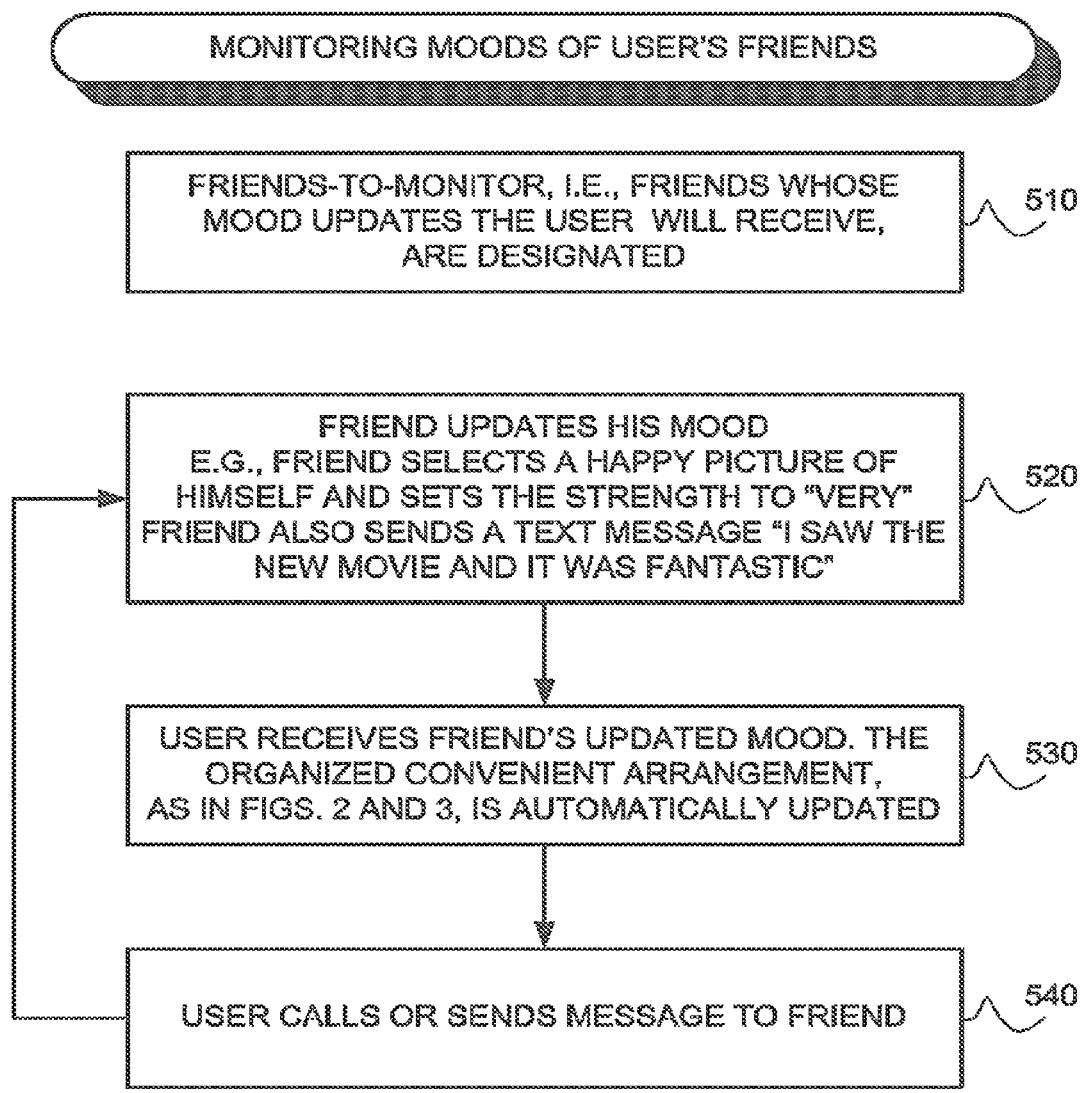
FIG. 5 is a simplified flowchart of operation of the mood-based messaging device of FIG. 1 for monitoring friends' moods, in accordance with an embodiment of the present invention.

Reference is made to FIG. 5, which is a simplified flowchart of operation of the mood-based messaging device 100 for monitoring friends' moods, in accordance with an embodiment of the present invention. At step 510, the user's friends-to-monitor are designated. In accordance with an embodiment of the present invention, such designation occurs automatically when the user approves being designated as a member of each friend's friends-to-notify list. I.e., when the user receives an invitation from a friend, to be a member of the friend's friends-to-notify list, and the user accepts the invitation, then the friend is automatically designated as one of the user's friends-to-monitor.

Step 510 is performed periodically, and not necessarily at the times when the user receives notifications of his friends' moods. As such, there is no flow arrow in FIG. 5 between step 510 and step 520.

At step 520, one of the designated friends updates his mood. For example, the friend may select a "happy" mood and select a strength/intensity of "very". The friend may also include a text message, such as "I saw the new movie and it is fantastic." At step 530, the user receives information about the friend's updated mood, including, in accordance with an embodiment of the present invention, a text message and an image of the friend according to his happy mood. The friend's updated mood is organized and arranged on the user's display 110 as in FIGS. 2 and 3.

In response to being notified about the friend's updated mood, the user may call or send a message to the friend at step 540. The friend continues to update his mood at step 520, as appropriate.

It will be appreciated by those skilled in the art that the present invention is instrumental in stimulating communication among friends.

In order to further stimulate communication, according to an embodiment of the present invention, a user may "nudge" one or more of his friends-to-notify, by sending communications that generate an audio, a visual or a tactile vibration alert on the friends' mood-based messaging devices.

One implementation of the present invention uses a "jacket" into which a modular cell phone may be inserted. A jacket is defined herein to mean a device that provides an enhanced user interface for the modular cell phone, enriches the capabilities of the modular cell phone, and is generally not able to operate independently when the modular cell phone is not connected thereto.

Figure 6:
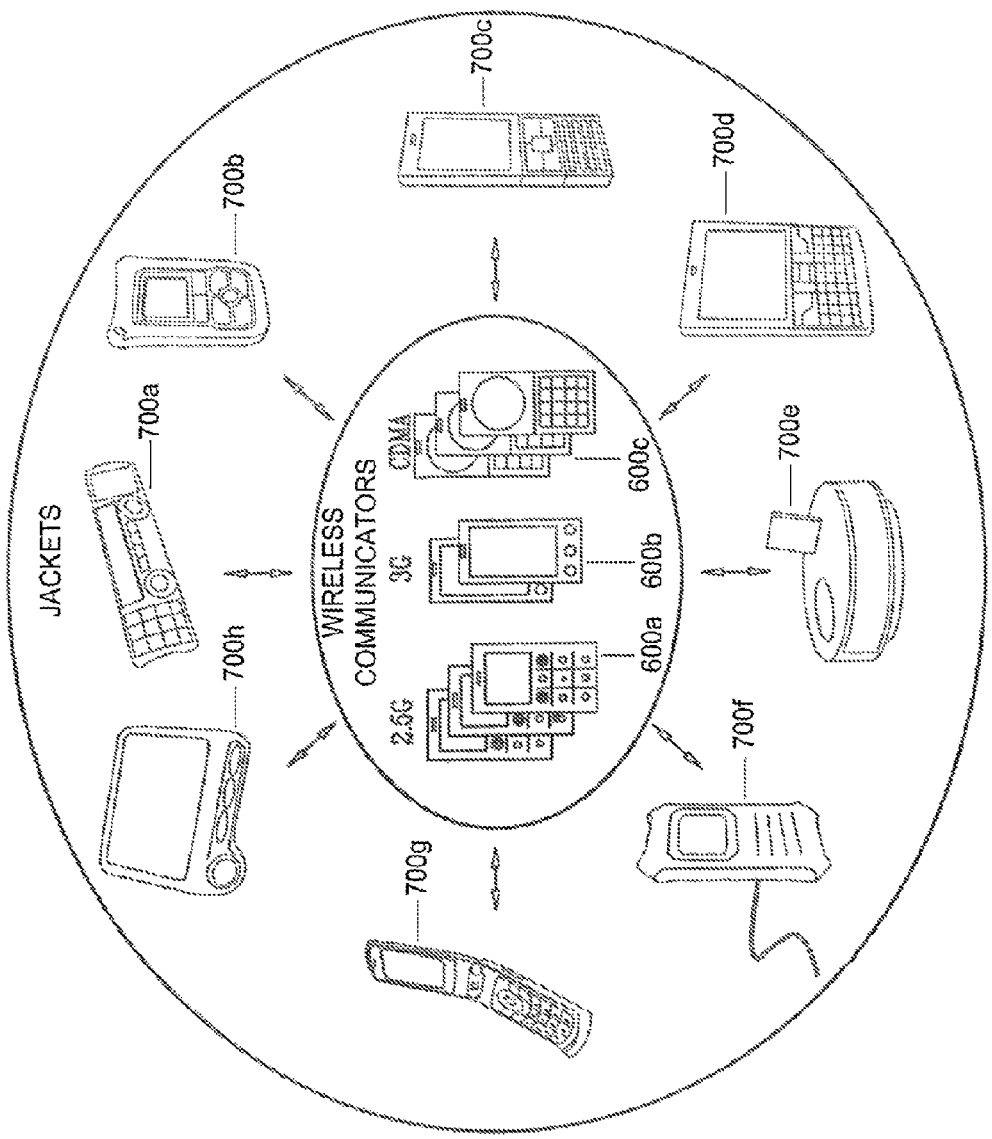
FIG. 6 is an illustration of a communication system constructed and operative in accordance with an embodiment of the present invention.

Reference is now made to FIG. 6, which is an illustration of a communication system constructed and operative in accordance with an embodiment of the present invention. Shown in FIG. 6 are a plurality of modular cell phones 600a-600c, including 2.5G cell phones for a GSM network, 3G cell phones for GSM network, and CDMA cell phones for a CDMA network. It will be appreciated by those skilled in the art that the networks illustrated in FIG. 6 are exemplary of a wide variety of networks and communication protocols that are supported by the modular cell phones, such networks and communication protocols including inter alia WiFi, Bluetooth and WiMax.

Also shown in FIG. 6 is a plurality of jackets 700a-700h. In accordance with an embodiment of the present invention, each modular cell phone 600a-600c may be inserted into any of jackets 700a-700h, so as to operate in combination therewith. Modular cell phones 600a-600c are substantially of the same form factor and, as such, are able to be inserted into each of jackets 700a-700h.

One type of jacket 700, referred to herein as a "mood jacket", corresponds to the mood-based messaging device 100 of FIG. 1. Modular cell phone 600 provides the message communication functionality, and mood jacket 700 provides a mood-based user interface, such as the user interface shown in FIGS. 1 and 2.

Figure 7:
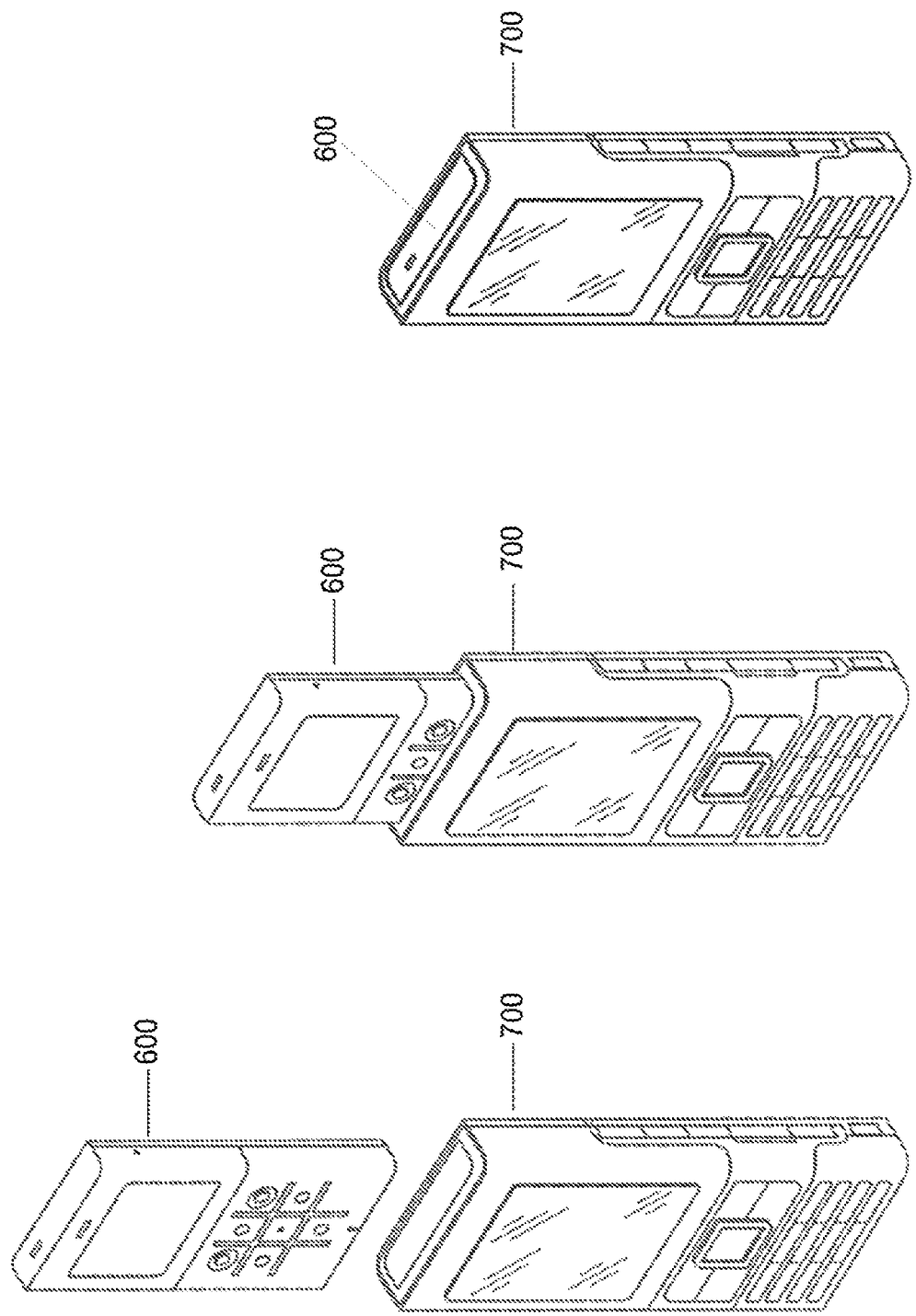
FIG. 7 is an illustration of a modular cell phone being inserted into a jacket, in accordance with an embodiment of the present invention.

Reference is further made to FIG. 7, which is an illustration of a modular cell phone 600 being inserted into a jacket 700, in accordance with an embodiment of the present invention. Jacket 700 as shown in FIG. 7 includes a hollow cavity at the top for insertion of modular cell phone 600 therein.

Figure 8:
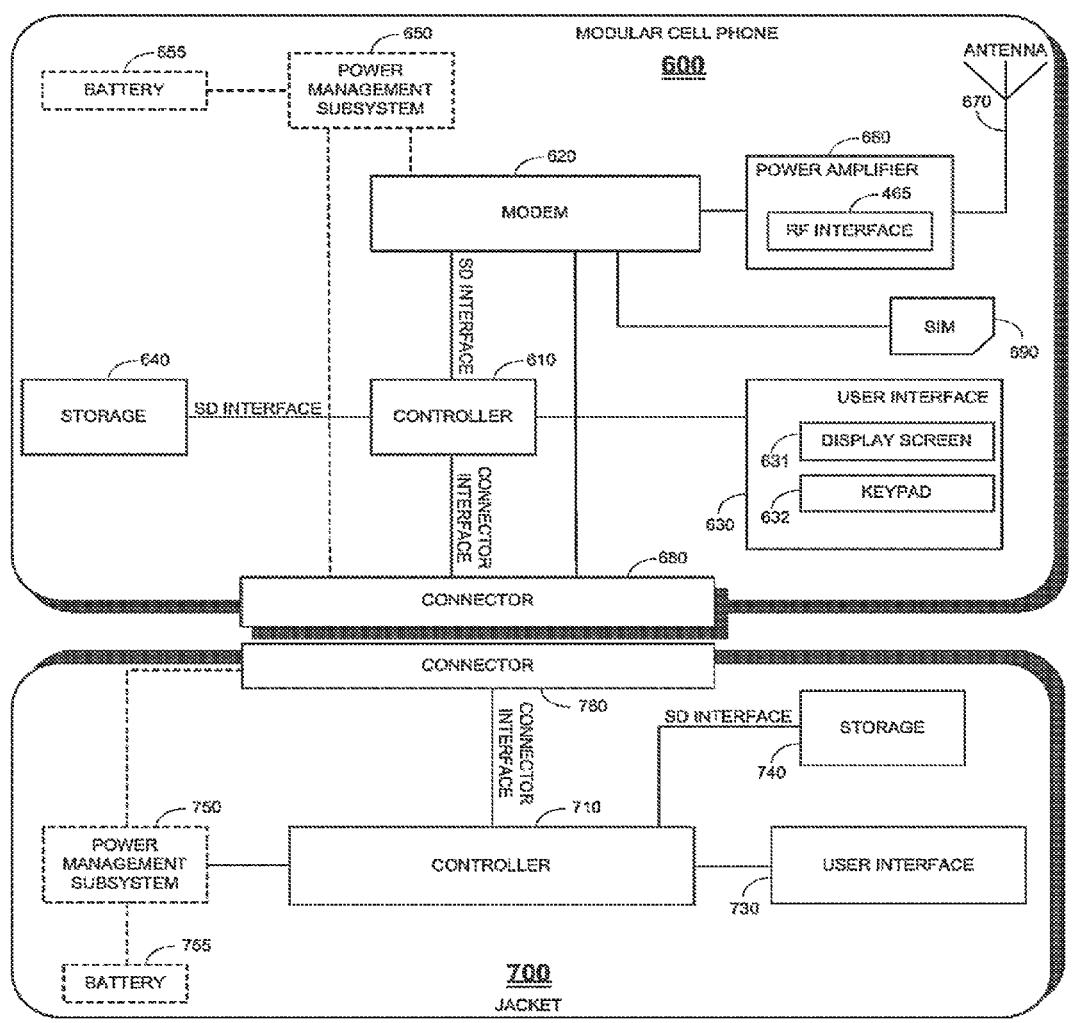
FIG. 8 is a simplified block diagram of a modular cell phone and a jacket in accordance with an embodiment of the present invention.

Reference is now made to FIG. 8, which is a simplified block diagram of modular cell phone 600 and jacket 700 in accordance with an embodiment of the present invention. Modular cell phone 600 includes eight primary components, as follows: a controller 610, a modem 620 for sending and receiving voice and data, a user interface 630, a memory storage 640, a power amplifier 660, an antenna 670, a connector 680 for connecting the modular cell phone to jacket 700 when the modular cell phone is inserted into jacket 700, and a subscriber identification module (SIM) 690.

Controller 610 executes programmed instructions that control the data flow between modular cell phone 600 and jacket 700. Modem 620 controls the communication functionality of modular cell phone 600. User interface 630 includes a display screen 631 and a keypad 632. User interface 630 may optionally include additional components (not shown) such as a microphone, a headset audio jack, an earpiece, a mono speaker or stereo speakers, and a vibrator.

Power amplifier 660 includes a radio frequency (RF) interface 665, and is connected to antenna 670.

In accordance with an embodiment of the present invention, the interface between controller 610 and storage 640, and the interface between controller 610 and modem 620 are both SD interfaces. The interface between controller 610 and connector 680 is a custom interface.

Modular cell phone 600 may also include an optional power management subsystem 650, which includes charging circuitry for charging a battery 655.

In some embodiments of the present invention, modular cell phone 600 is operable as a standalone phone. In other embodiments of the present invention, modular cell phone 600 is not operable as a standalone phone, and may be missing some of the components shown in FIG. 8, such display screen 631 or keypad 632.

Jacket 700 includes four primary components, as follows: a controller 710, a user interface 730, a memory storage 740, and a connector 780 for connecting the jacket to modular cell phone 600 when modular cell phone 600 is inserted into the jacket. Jacket 700 may also include an optional power management subsystem 750 and an optional battery 755.

In accordance with an embodiment of the present invention, the interface between controller 710 and storage 740 is an SD interface. The interface between controller 710 and connector 780 is a custom interface.

User interface 730 of the mood jacket may have controls as shown in FIG. 1. Specifically user interface 730 includes a display 110, buttons 120 for selecting a mood, a slider bar 125 for selecting a strength of a mood, a slider bar 130 for designated the user's whereabouts, a button 140 for updating the user's friends-to-notify about the user's current mood, and LEDs 150 for indicating when a friend's mood has changed. User interface 730 may optionally include additional components (not shown), such as a microphone, a headset audio jack, an earpiece, a mono speaker or stereo speakers, and a vibrator.

It will be appreciated by those skilled in the art that different types of user interface controls may be used to implement the mood jacket, instead of those shown in FIG. 1. For example, selection of a mood may be performed by a knob dial, a jog dial, a slider or a plurality of buttons. Similarly, selection of the strength of a mood may be performed using a multi-level switch, a jog dial or a pressure switch, instead of slider bar 125. Similarly, selection of a user's whereabouts may be performed using a multi-level switch, a jog dial or a pressure switch, instead of slider bar 130.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A user interface for social interacting using a portable messaging device, comprising:
   a display for displaying representations of moods of a first plurality of friends;
   an activatable mood selector for selecting one of several moods from time to time; and
   a mechanical activatable update button for sending one or more representations of the currently selected mood to a second plurality of friends.

2. The user interface of claim 1 wherein at least one of the one or more representations of the selected mood is an image.

3. The user interface of claim 2 wherein the image comprises a picture or caricature of someone in accordance with the selected mood.

4. The user interface of claim 1 further comprising a camera for capturing a photo, and wherein at least one of the one or more representations of the selected mood is the photo captured by said camera.

5. The user interface of claim 1 wherein said mood selector comprises a plurality of mood buttons.

6. The user interface of claim 1 wherein said mood selector comprises a knob dial.

7. The user interface of claim 1 wherein said mood selector comprises a jog dial.

8. The user interface of claim 1 wherein said mood selector comprises a slider bar.

9. The user interface of claim 1 further comprising a slider bar for selecting a strength of the selected mode, wherein a representation of the selected strength is also sent to the second plurality of friends when said update button is activated.

10. The user interface of claim 1 further comprising a jog dial for selecting a strength of the selected mode, wherein a representation of the selected strength is also sent to the second plurality of friends when said update button is activated.

11. The user interface of claim 1 further comprising a knob dial for selecting a strength of the selected mode, wherein a representation of the selected strength is also sent to the second plurality of friends when said update button is activated.

12. The user interface of claim 1 further comprising a multi-level switch for selecting a strength of the selected mode, wherein a representation of the selected strength is also sent to the second plurality of friends when said update button is activated.

13. The user interface of claim 1 further comprising a pressure switch for selecting a strength of the selected mode, wherein a representation of the selected strength is also sent to the second plurality of friends when said update button is activated.

14. The user interface of claim 1 further comprising a slider bar for designating whereabouts of the portable messaging device, wherein the designated whereabouts are also sent to the second plurality of friends when said update button is activated.

15. The user interface of claim 1 further comprising a jog dial for designating whereabouts of the portable messaging device, wherein the designated whereabouts are also sent to the second plurality of friends when said update button is activated.

16. The user interface of claim 1 further comprising a knob dial for designating whereabouts of the portable messaging device, wherein the designated whereabouts are also sent to the second plurality of friends when said update button is activated.

17. The user interface of claim 1 further comprising a multi-level switch for designating whereabouts of the portable messaging device, wherein the designated whereabouts are also sent to the second plurality of friends when said update button is activated.

18. The user interface of claim 1 further comprising a plurality of LEDs, for indicating when a mood of a friend from the first plurality of friends has been updated.

19. The user interface of claim 1 wherein the first plurality of friends is the same as the second plurality of friends.

20. The user interface of claim 1 wherein the first plurality of friends is different than the second plurality of friends.

21. The user interface of claim 1 wherein the selected mood is published to one or more social networks when said update button is activated.

* * * * *